United States Patent
Metcalfe et al.

(10) Patent No.: US 8,656,542 B2
(45) Date of Patent: Feb. 25, 2014

(54) RAMP INSERT

(71) Applicants: Paul R. Metcalfe, Solon, OH (US); Anil V. Singaraju, Columbus, IN (US); Scott E. Urban, Cleveland, OH (US); Francis Bernart, North Canton, OH (US); Cynthia K. Eubank, Barberton, OH (US)

(72) Inventors: Paul R. Metcalfe, Solon, OH (US); Anil V. Singaraju, Columbus, IN (US); Scott E. Urban, Cleveland, OH (US); Francis Bernart, North Canton, OH (US); Cynthia K. Eubank, Barberton, OH (US)

(73) Assignee: Cequent Consumer Products, Inc., Solon, OH (US)

( * ) Notice: Subject to any disclaimer, the term of this patent is extended or adjusted under 35 U.S.C. 154(b) by 0 days.

(21) Appl. No.: 13/928,013

(22) Filed: Jun. 26, 2013

(65) Prior Publication Data

US 2013/0283549 A1    Oct. 31, 2013

Related U.S. Application Data

(63) Continuation of application No. 13/088,996, filed on Apr. 18, 2011, now Pat. No. 8,495,779, which is a continuation-in-part of application No. 12/455,373, filed on Jun. 1, 2009, now Pat. No. 7,926,139.

(60) Provisional application No. 61/130,459, filed on May 30, 2008.

(51) Int. Cl.
*E01D 1/00*    (2006.01)

(52) U.S. Cl.
USPC .................. 14/69.5; 182/27; 193/38

(58) Field of Classification Search
USPC ................. 404/69.5; 182/27; 193/38
See application file for complete search history.

(56) References Cited

U.S. PATENT DOCUMENTS

| | | | | |
|---|---|---|---|---|
| 5,213,458 A | * | 5/1993 | Preller et al. | 410/26 |
| 5,538,308 A | * | 7/1996 | Floe | 296/61 |
| 5,553,989 A | * | 9/1996 | Ullman | 414/537 |
| D398,129 S | * | 9/1998 | Sacks et al. | D34/32 |
| 5,926,889 A | * | 7/1999 | Riesselmann et al. | 14/69.5 |
| 6,811,067 B2 | * | 11/2004 | Muizelaar et al. | 224/404 |
| 7,100,231 B2 | * | 9/2006 | Peschmann | 14/69.5 |
| 7,524,156 B2 | * | 4/2009 | Garbes | 414/537 |
| 7,926,139 B2 | * | 4/2011 | Metcalfe et al. | 14/69.5 |
| 2001/0031193 A1 | * | 10/2001 | Chevrier | 414/522 |
| 2004/0083562 A1 | * | 5/2004 | Leblanc | 14/69.5 |
| 2006/0177294 A1 | * | 8/2006 | Garbes | 414/537 |

* cited by examiner

*Primary Examiner* — Raymond W Addie
(74) *Attorney, Agent, or Firm* — McDonald Hopkins LLC

(57) ABSTRACT

The present invention is directed to a ramp insert for insertion between rails and/or rungs of a ramp. An embodiment of the present invention includes a body that may have an adjustable length. The body may include a first section that may include a track portion and a second section that may include a groove portion. The groove portion may be capable of fitting together with the track portion. The first or second section may be capable of slidably moving with respect to the other section via the track portion and the groove portion. The ramp insert may be placed between the rails and/or rungs of the ramp whereby the ramp insert may be adjusted to various lengths. Since the ramp insert may be adjusted to various lengths, the ramp insert may fit many different kinds of ramps having various widths.

24 Claims, 16 Drawing Sheets

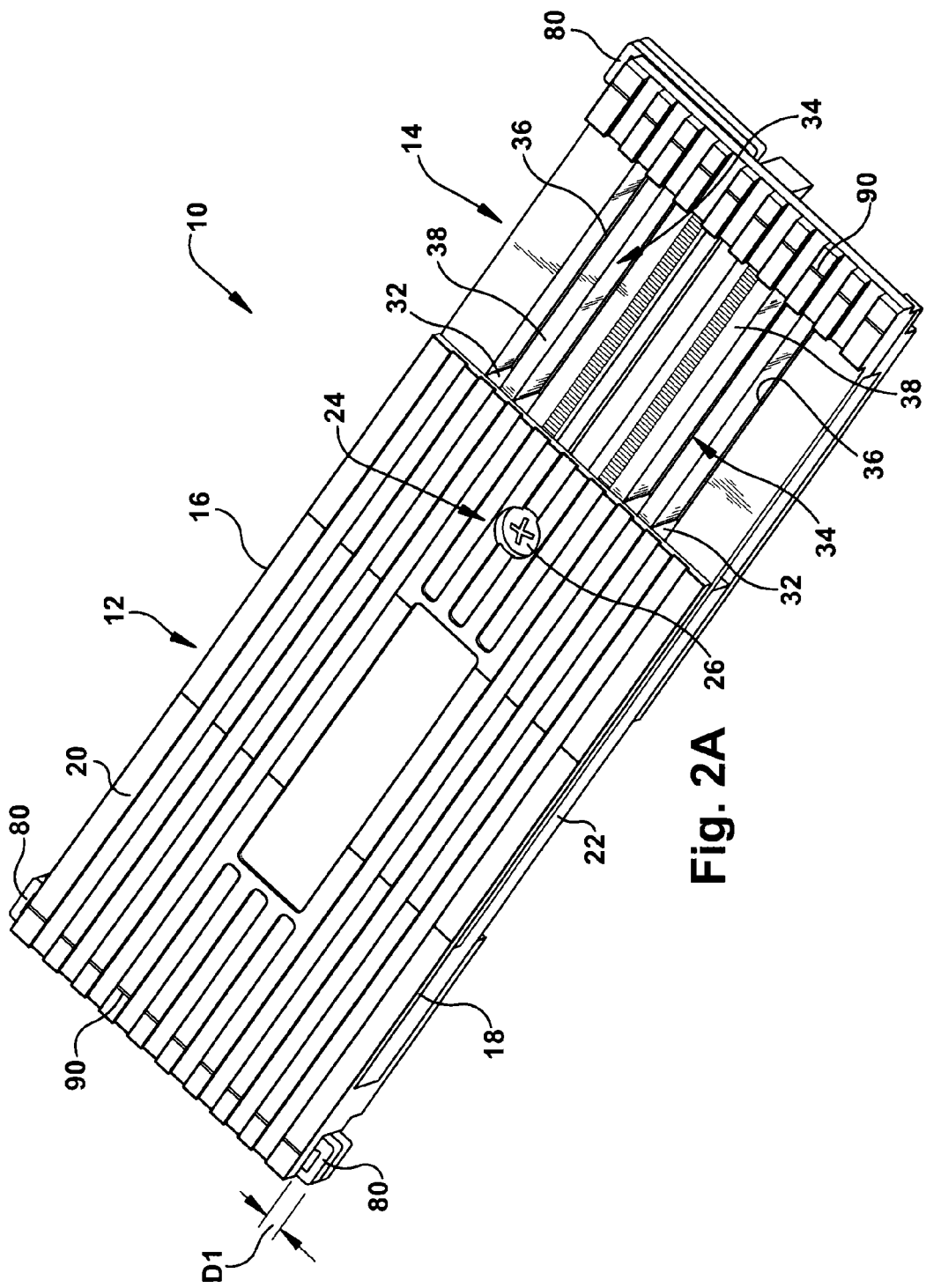

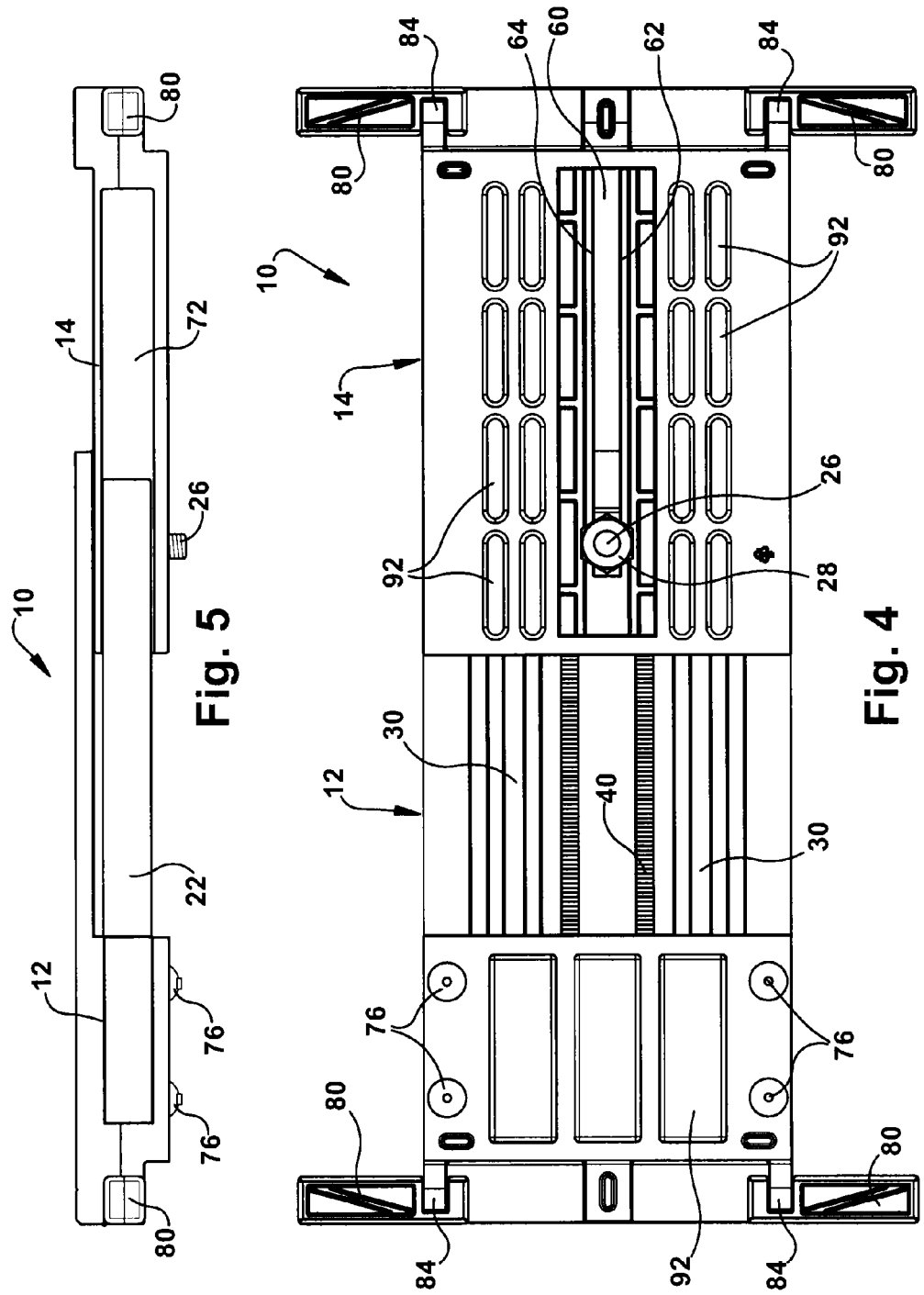

RAMP INSERT

CROSS-REFERENCE TO RELATED APPLICATION

This application is a continuation of U.S. patent application Ser. No. 13/088,996, entitled "Ramp Insert," filed on Apr. 18, 2011, which is a continuation-in-part of U.S. patent application Ser. No. 12/455,373, entitled "Ramp Insert," filed on Jun. 1, 2009, now U.S. Pat. No. 7,926,139, which claims the benefit of U.S. Provisional Patent Application No. 61/130,459, entitled "Ramp Insert," filed on May 30, 2008, all of which are hereby incorporated in their entirety by reference.

FIELD OF INVENTION

The present invention relates generally to ramps, and more particularly, to an apparatus, such as a ramp insert that may be capable of providing a continuous surface between rungs of a ramp.

BACKGROUND OF THE INVENTION

Numerous types of ramps are often used to assist in the loading and unloading of objects from transportation vehicles. Particularly, trucks, vans, trailers and the like may utilize ramps to assist in the loading of objects such as ATVs, motorcycles, lawnmowers, etc. One common type of ramp may consist of a plurality of rungs whereby each rung is separated from a successive rung by an open space. The rungs are connected at or near the ends by rails. The successive rungs and the rails form a series of frame-like structures surrounding the central openings, similar to a ladder. Such a structure allows for loading and unloading of objects, such as ATVs, motorcycles, lawnmowers and etc., as long as the diameter of the tires of such objects is greater than the gap or distance between the successive rungs. In other words, the tires of the objects to be loaded must be greater in size than the central openings between the successive rungs of the ramp so that the object can be moved along the ramp.

Users frequently load many different types of objects onto the transporting vehicle. For example, a user may desire to use a single ramp to load a motorcycle and an ATV onto the transporting vehicle. However, the ATV and the motorcycle may have different sized tires so that the single ramp is unable to allow a user to effectively load and unload the ATV and the motorcycle. Accordingly, a user must connect a first type of ramp to the transporting vehicle to load the motorcycle, disconnect the first type of ramp, and connect a second type of ramp to the transporting vehicle to load the ATV. In addition, in such an example, the user must transport both types of ramps in order to be able to unload the ATV and the motorcycle.

Even if a single ramp is able to accommodate a few different types of objects to be loaded, the central opening between the rungs often causes difficulty in the loading and unloading of those certain objects. For example, even if the object, such as an ATV, has tires with diameters greater than the length of the central opening of the ramp, the tires may be difficult to move from one central opening to another central opening along the length of the ramp. The user must apply sufficient force to move the object from one central opening of the ramp, over the ramp rung and into the next central opening of the ramp.

Advantageously, the present invention provides an apparatus for insertion between rungs of a ramp to provide a surface for unloading and loading objects. The central opening between the rungs may be partially, substantially or completely filled by the apparatus to ease the loading and unloading of the object for the user.

BRIEF DESCRIPTION OF THE DRAWINGS

FIG. 2A is an isometric view of a ramp insert in an embodiment of the present invention.

FIG. 4 is a front view of the ramp insert of FIG. 2A.

FIG. 5 is a bottom view of the ramp insert of FIG. 2A.

SUMMARY OF INVENTION

The present invention is directed to a ramp insert for insertion between rails and/or rungs of a ramp. A ramp insert for insertion between a pair of rails of a ramp, where the rails are a width apart, may include a first body capable of engaging at least one of the rails, a second body capable of engaging with the first body, where engagement of the first body with the second body engages the second body with the other one of the pair of rails.

A ramp insert for engagement with a ramp having first and second rails and a plurality of rungs, may include a first body capable of engaging at least one of the first rail and one of the plurality of rungs, a second body capable of engaging at least one of the second rail and one of the plurality of rungs, the second body being at least partially overlapped with the first body where the first and second bodies are moveable relative to one another so that the second body engages with the second rail when the first body engages the first rail and engages with another one of the plurality of rungs when the first body engages the one of the plurality of rungs.

A ramp insert for insertion between rungs of a ramp, where the rungs are a width apart, may include a body capable of extending over at least a portion of a pair of adjacent ones of the rungs, and an attachment portion extending from the body and capable of attaching to at least one of the rungs of the pair of rungs, where engagement of the body with the pair of rungs and the engagement of the attachment portion with one of the pair of rungs secures the ramp insert to the ramp.

DETAILED DESCRIPTION OF THE INVENTION

Reference will now be made in detail to exemplary embodiments of the present invention, examples of which are illustrated in the accompanying drawings. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1:
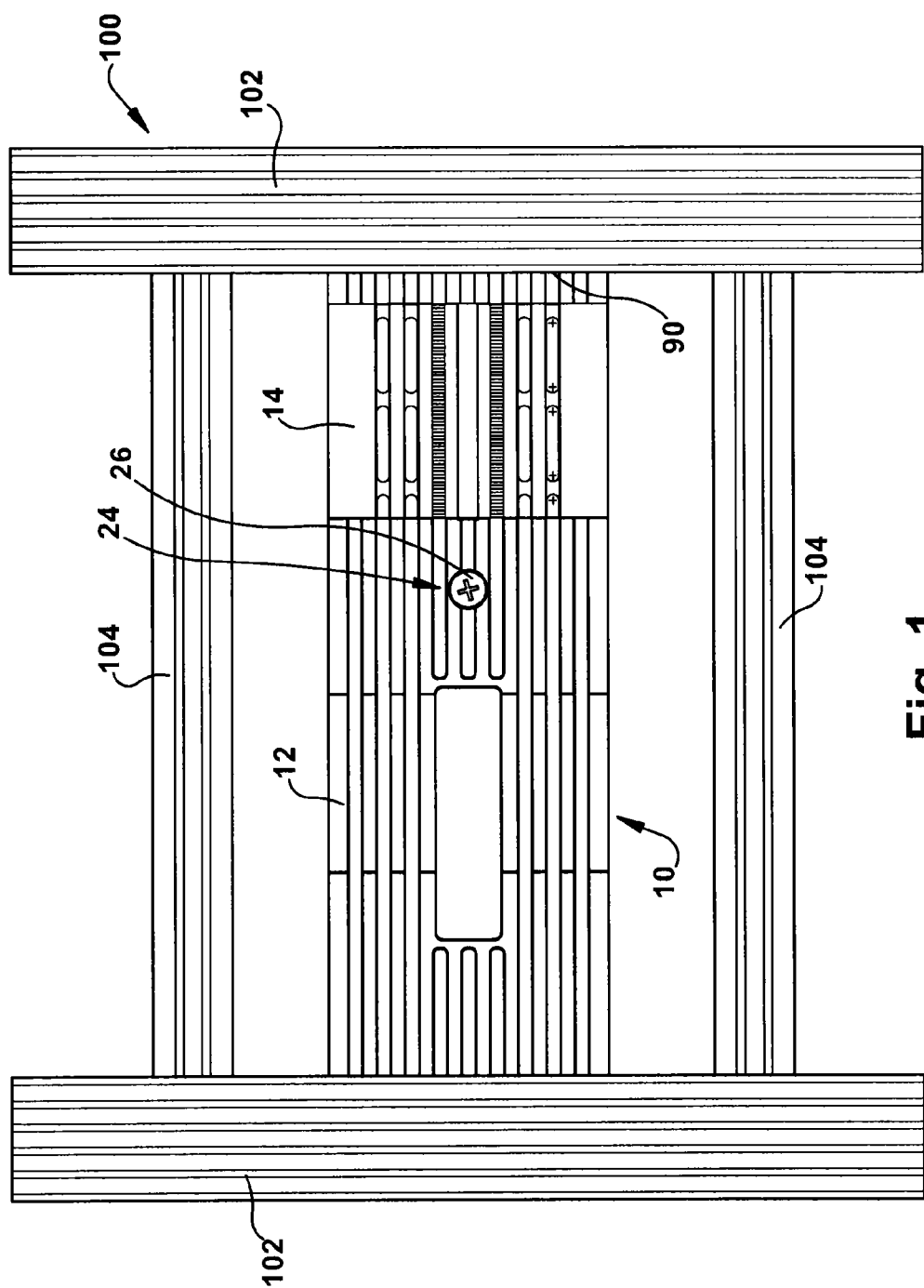
FIG. 1 is a top view of a ramp insert connected to a ramp in an embodiment of the present invention.
Figure 2B:
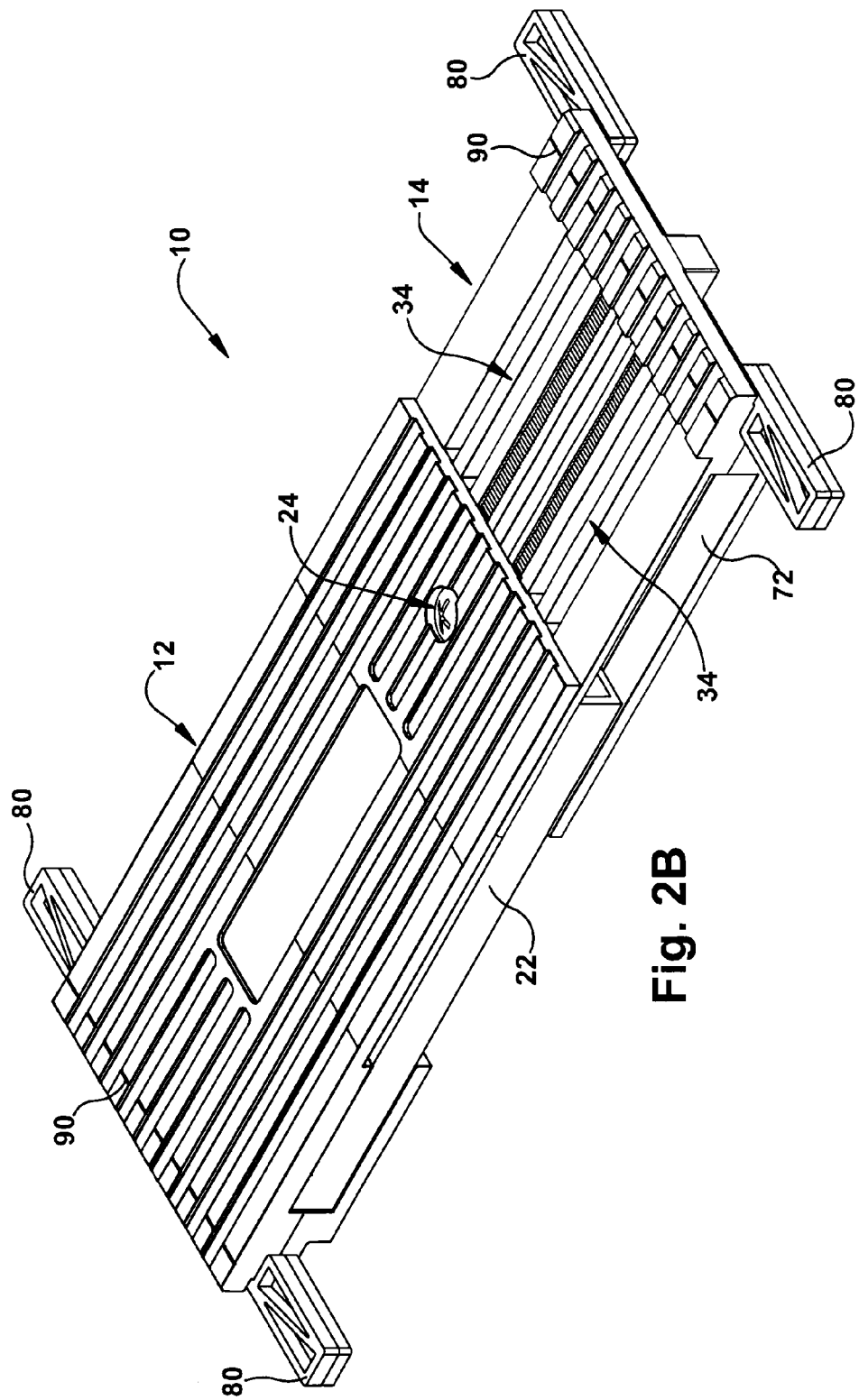
FIG. 2B is an isometric view of the ramp insert of FIG. 2A having extended blocks for connection to a ramp.

With reference to FIGS. 1-2B, a ramp insert 10 is shown. The ramp insert 10 may be capable of being connected to the rails 102 of a ramp 100 by any appropriate means, such as being connected between successive rungs 104 of the ramp 100, for example. The ramp insert 10 may provide a surface between the rungs 104 of the ramp 100. This surface may ease in the loading and unloading of items, such as, motorcycles, dirt bikes, bicycles, mopeds, ATVs, and the like.

The ramp insert 10 may include a first section 12 and a second section 14, as shown in FIGS. 2A-5. The first section 12 may be of any appropriate shape or size, such as of a generally rectangular shape, for example. The second section 14 may be of any appropriate shape or size, such as of a generally rectangular shape, for example. The first section 12 and the second section 14 may be of generally similar shapes and sizes or they may be of different shapes and sizes, and should not be limited to those examples shown and described herein. The first section 12 and the second section 14 may be connected and movable with respect to one another. The overall length of the ramp insert 10 may be changed by moving the first section 12 and/or the second section 14 with respect to one another. To this end, the ramp insert 10 may be used in many types of ramps 100 having various distances between the rails 102.

In an embodiment, the second section 14 may retract into and extend from the first section 12. In such an embodiment, the length of the ramp insert 10 may change depending upon the amount of the second section 14 that may be extended from or inserted into the first section 12. To this end, the ramp insert 10 may have a minimum length where the second section 14 is at a retracted position within, below, or above the first section 12. The ramp insert 10 may have a maximum length where the second section 14 is at an extended position from the first section 12. It may be preferable to have at least a portion of one of the sections 12, 14 overlapping the other section 12, 14 to provide strength to the structure of the ramp insert 10. While shown and described where the second section 14 may retract into or extend out of the first section 12, the present invention should not be limited to such an embodiment, and it is clearly contemplated and will be appreciated that the first section 12 may retract into or extend out of the second section 14.

The first section 12, for example, may have a track portion 30 for slidably moving the first section 12 with respect to the second section 14, as best shown in FIGS. 5-8. In such an embodiment, the second section 14 may have a groove portion 34 for engaging and slidably connecting to the track portion 30, as best shown in FIGS. 2A, 2B, 9 and 10. While shown and described as utilizing a track and groove portion 30, 34, the present invention should not be limited to such an embodiment, and it is clearly contemplated and will be appreciated that the first section 12 and the second section 14 of the ramp insert 10 may engage in any other appropriate manner.

In an embodiment, the track portion 30 may include ribs 32. The ribs 32 may extend from the top surface 20 of the first section 12. The ribs 32 may be of any appropriate shape or size. The ribs 32 may be integrally formed with the first section 12 which along with the geometric shape of the ribs 32 may allow the ribs 32 to transmit the load from the center of the ramp insert 10 to the ends of the ramp 100 and, in turn, to the ground or vehicle in which the ramp 100 may be attached.

In such an embodiment, the groove portion 34 may include grooves 36. The grooves 36 may be of any appropriate shape or size, such as being substantially similar in size and shape to the ribs 32, such that the sections 12, 14 may be extended and/or retracted. As a result, the groove portion 34 may have a similar rib-like structure 38 located between the grooves 36. The ribs 38 of the second portion 14 may be integrally formed with the second portion 14.

The track portion 30 and the groove portion 34 may provide structural support, when the ramp insert 10 is in use, such as standing on, walking on, or loading vehicles, ATVs, etc. As a result of the track portion 30 and the groove portion 34, the load bearing on the ramp may be transferred in a perpendicular direction to the top surface 20 of the ramp insert 10 and may be dispersed or otherwise absorbed by the ramp 100, including the rails 102 and the rungs 104.

As best shown in FIGS. 2A, 3, 5, 8-12 and 16-17, the first section 12 and the second section 14 may include serrated portions 40, 42. The serrated portions 40, 42 may move with respect to each other. In a preferred embodiment, the first section 12 may have a serrated portion 40 that may mate or otherwise engage with the serrated portion 42 of the second section 14. The serrated portions 40, 42 may engage to provide support as the sections 12, 14 may be moved. The serrated portions 40, 42 may also prevent rapid expansion or contraction of the sections 12, 14 to the fully extended and fully retracted positions of the ramp insert 10.

Figure 17:
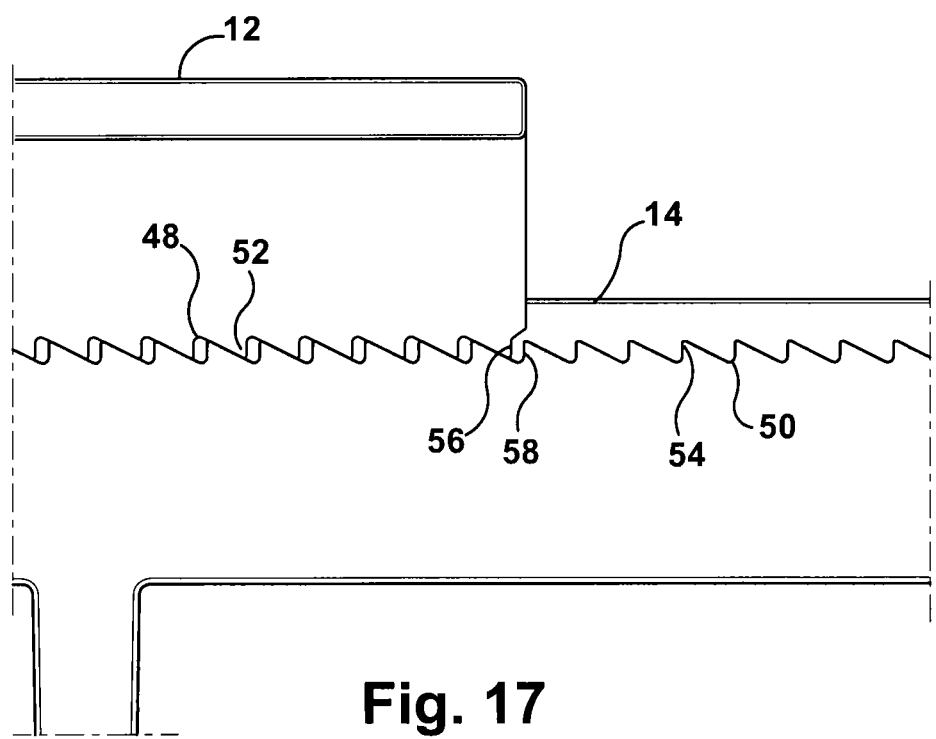
FIG. 17 is a close up side view of the first portion of the ramp insert connected to the second portion of the ramp insert in an embodiment of the present invention.

FIG. 17 illustrates a magnified view of the first and second sections 12, 14 engaging via the serrated portions 40, 42 in an embodiment. The first portion 12 may include an indentation portion 48 and a toothed portion 52. The second portion 14 may include an indentation portion 50 and a toothed portion 54. In such an embodiment, the indentation portion 50 and the toothed portion 54 of the second section 14 may engage the corresponding indentation 48 and tooth portion 52 of the first portion 12. The first section 12 and the second section 14 may also include respective stopping portions 56 and 58. The stopping portions 56, 58 may prevent further movement of the first section 12 and the second section 14 away from each other such as to a position in which the first section 12 may be separated from the second section 14.

The ramp insert 10 may further include a locking mechanism 24. The locking mechanism 24 may secure the first section 12 to the second section 14 to prevent movement and to permit movement of the sections 12, 14 with respect to each other. The locking mechanism 24 may be of any appropriate type of device capable of securing and locking the first section 12 and the second section 14 so that the length of the ramp insert 10 may be maintained. In an embodiment, the locking mechanism 24 may include use of fasteners, such as a screw 26 and a nut 28, for example.

Figure 3:
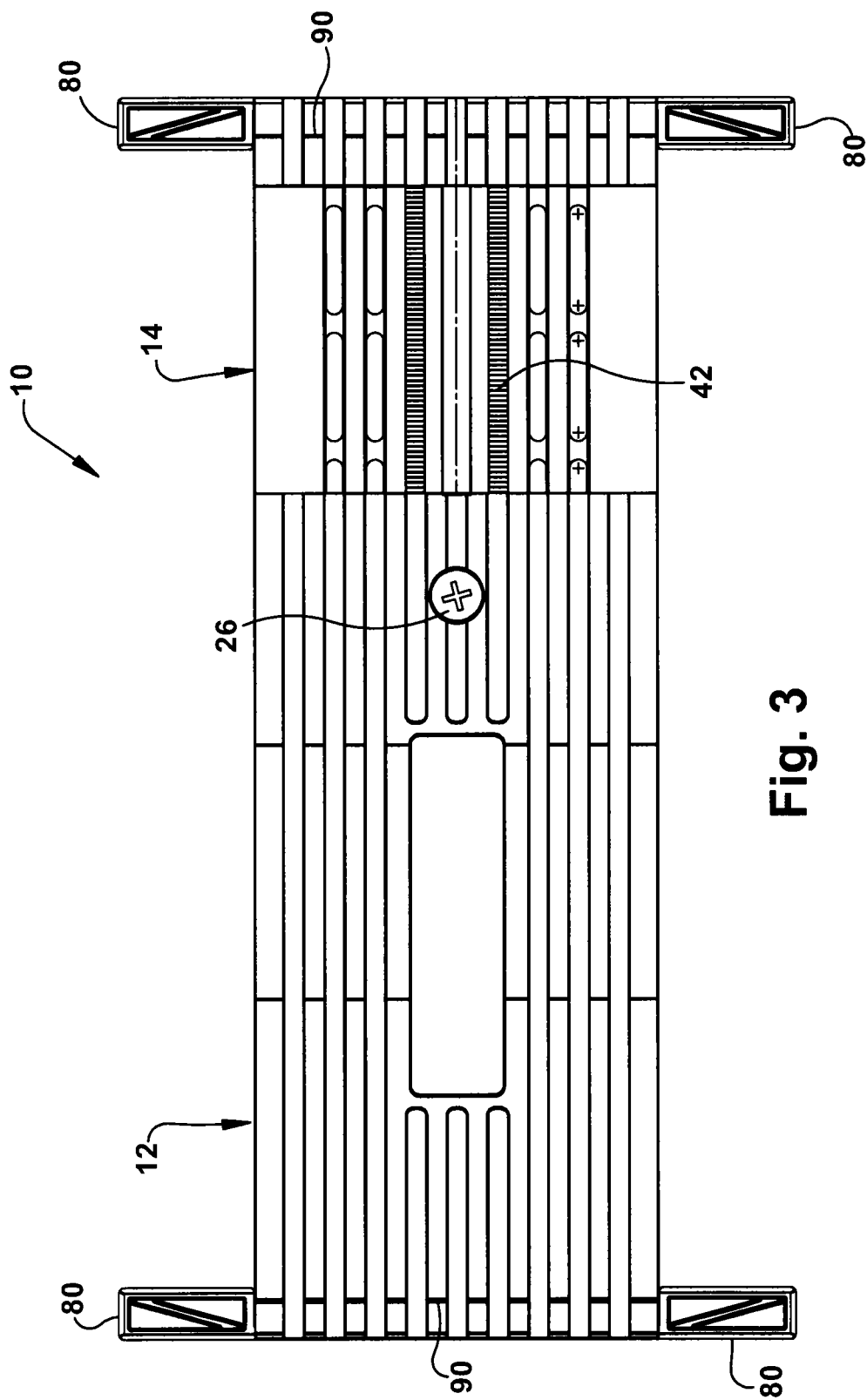
FIG. 3 is a top view of the ramp insert of FIG. 2A.
Figure 6:
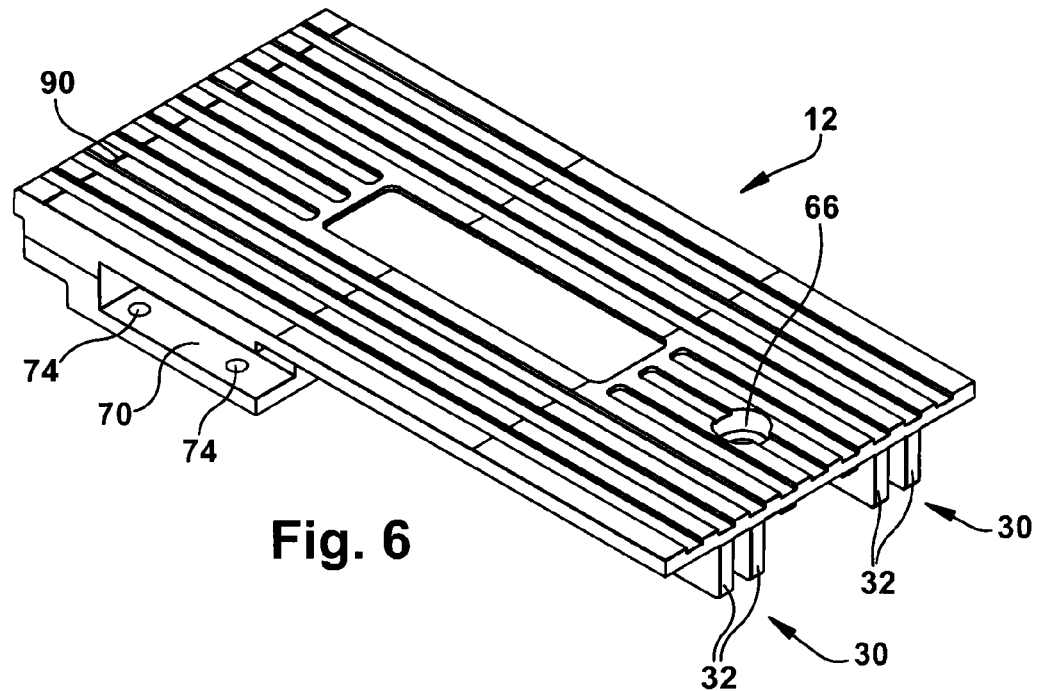
FIG. 6 is an isometric top view of a first portion of a ramp insert in an embodiment of the present invention.
Figure 7:
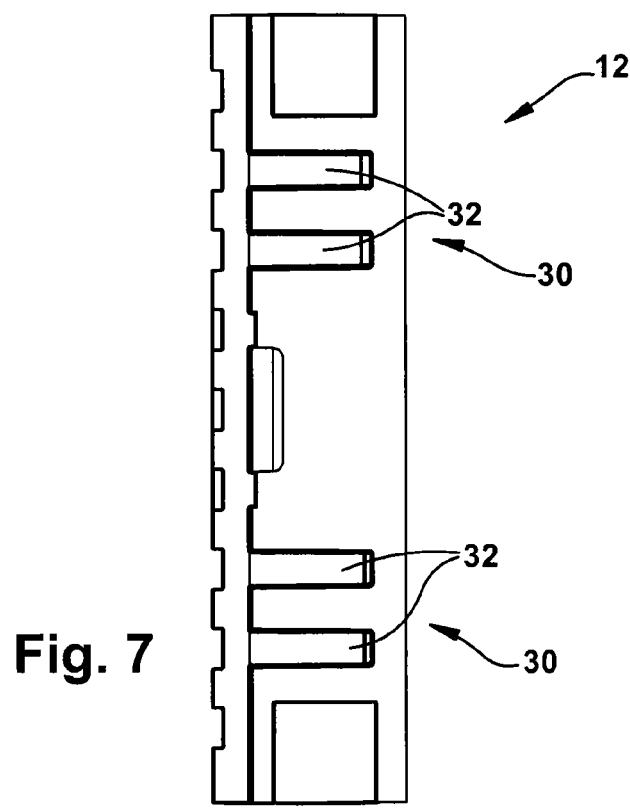
FIG. 7 is a side view of the first portion of the ramp insert of FIG. 6.
Figure 8:
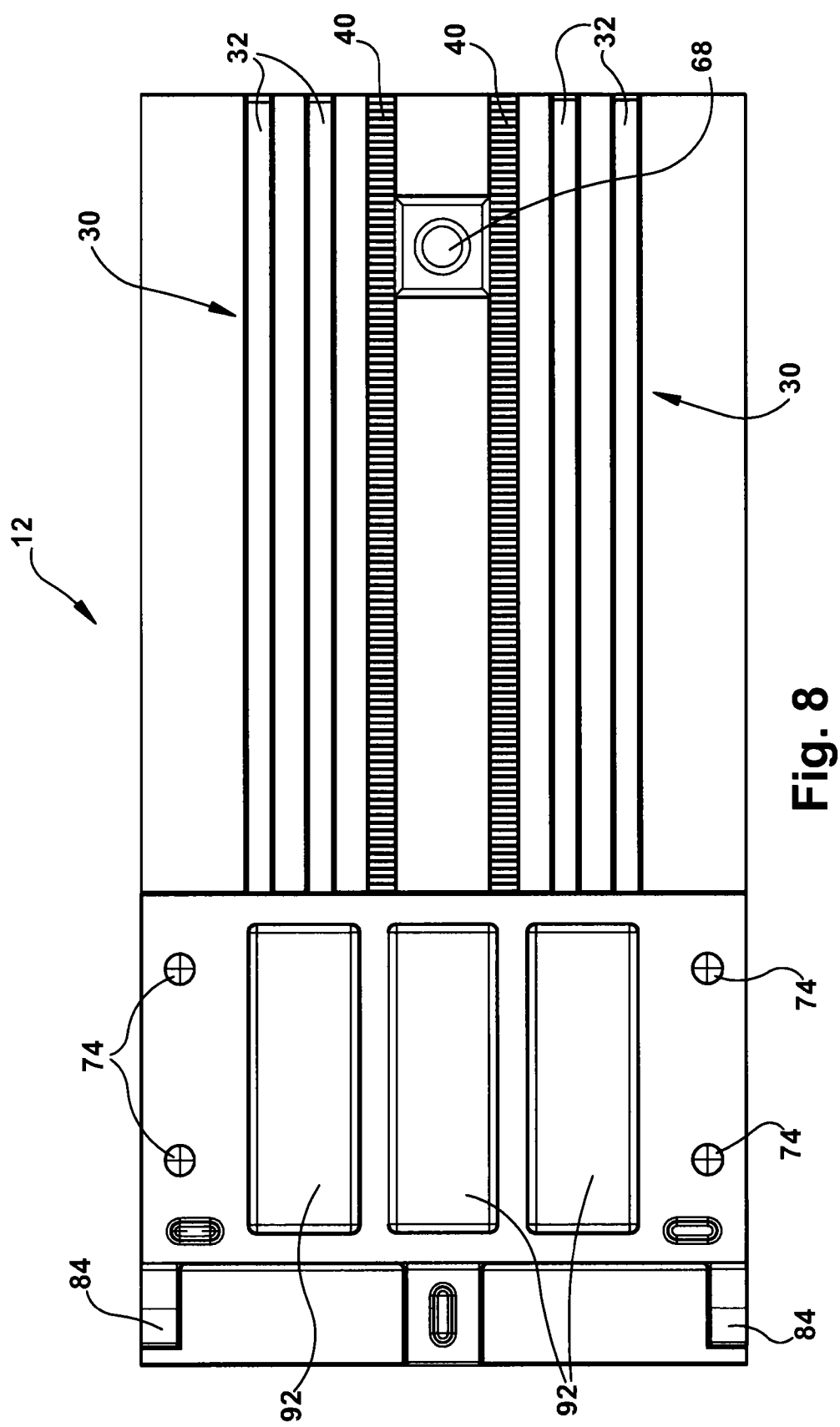
FIG. 8 is a bottom view of the first portion of the ramp insert of FIG. 6.

The screw 26 may be keyed and threaded into the nut 28, as best shown in FIGS. 3-5. The nut 28 may be keyed to the screw 26 such that the nut 28 may not thread out of or otherwise separate from the screw 26. As illustrated in FIG. 6, the first section 12 may also include a recess 66. The recess 66 may be of any appropriate shape or size. The recess 66 may be utilized for insertion and rotation of the screw 26 in one embodiment. The recess 66 may include an aperture 68, as shown in FIG. 8. The aperture 68 may be of any appropriate shape or size. The aperture 68 may have a size and shape substantially similar to the screw 26.

Rotation of the screw 26 in a first direction may permit movement of the first section 12 and/or the second section 14 to change the overall length of the ramp insert 10. At a predetermined length, the screw 26 may be rotated in a second direction, such as the opposite of the first direction, for example, to secure the first section 12 and the second section 14 and thereby prevent relative movement of the first section 12 and the second section 14.

The ramp insert 10 may include a recessed portion 60. The recessed portion 60 may be of any appropriate shape or size. The recessed portion 60 may include a first wall 62 and a second wall 64. The recessed portion 60 may provide access to the locking mechanism 24. The first wall 62 and the second wall 64 may be positioned at a distance from one another that may be substantially similar to the diameter of the nut 28. Accordingly, rotation of the nut 28 may be prevented by contact with the first wall 62 and the second wall 64. To this end, the user may engage and disengage the locking mechanism 24 without holding the nut 28.

The locking mechanism 24 may permit the user to change or adjust the overall length of the ramp insert 10 to correspond to the distance between the rails 102 of a ramp, such as the rails 102 of the ramp 100 shown in FIG. 1, for example. The locking mechanism 24 may permit the ramp insert 10 to be secured into various different types of ramps 100, such as ramps having differently or varyingly spaced rungs 104 and differently or varyingly spaced rails 102. The locking mechanism 24 may also incorporate a security feature (not shown), such as a key lock to prevent removal by unauthorized use.

Figure 9:
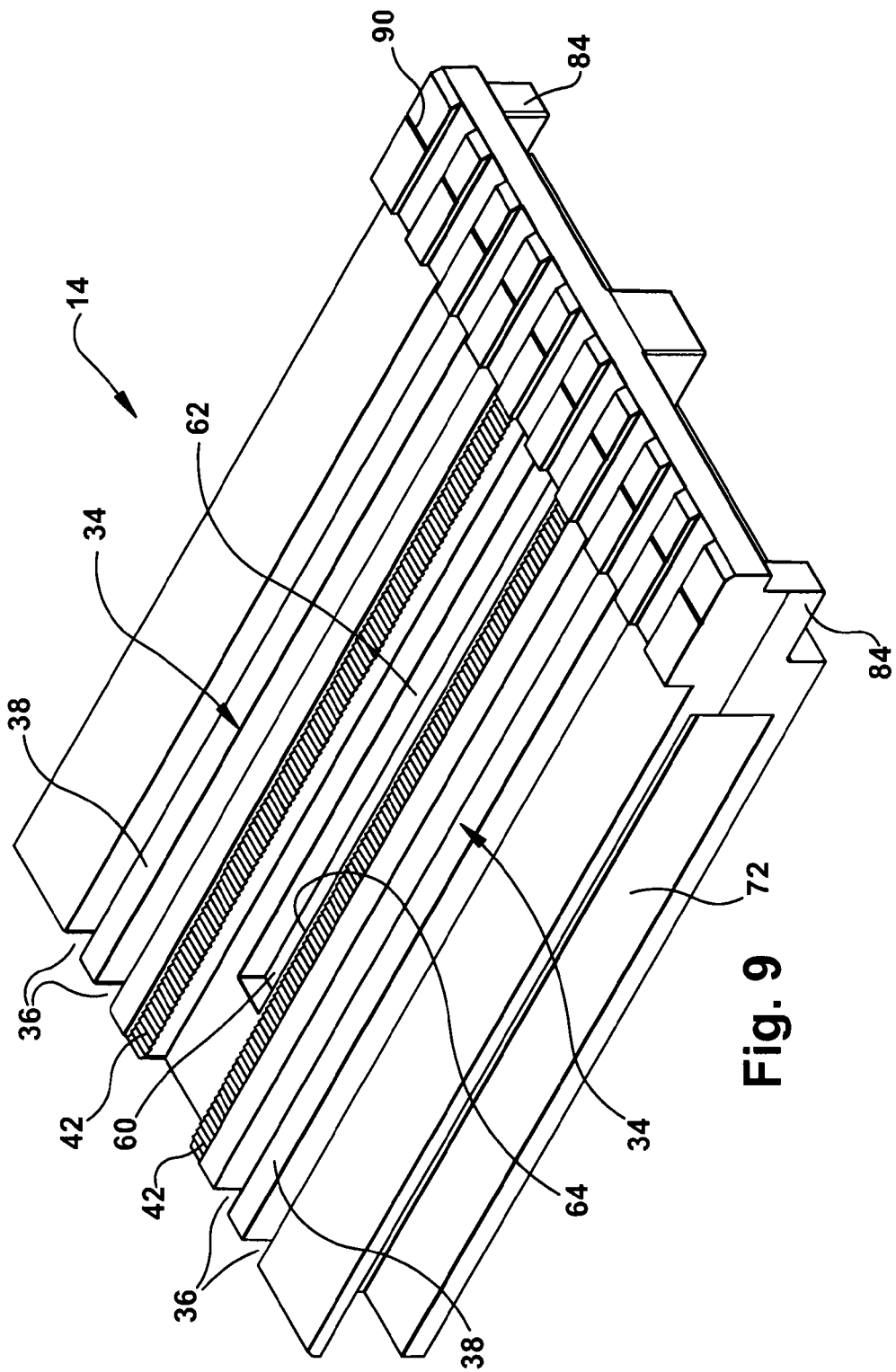
FIG. 9 is an isometric top view of a second portion of a ramp insert in an embodiment of the present invention.
Figure 10:
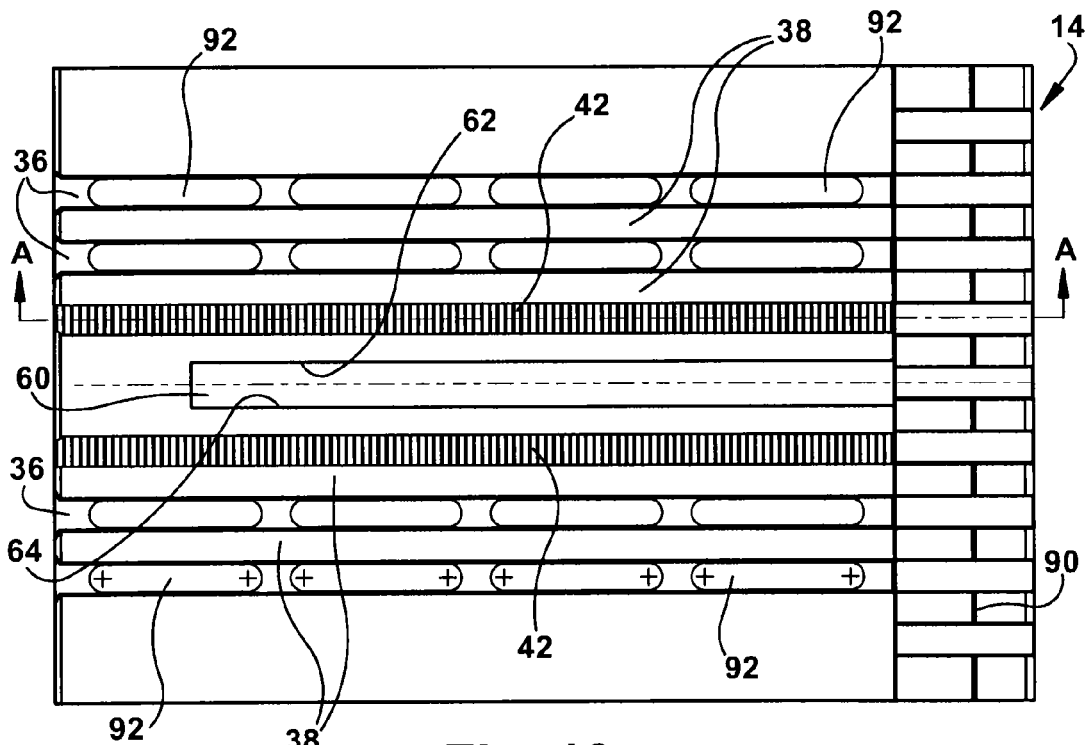
FIG. 10 is a top view of the second portion of the ramp insert of FIG. 9.
Figure 11:
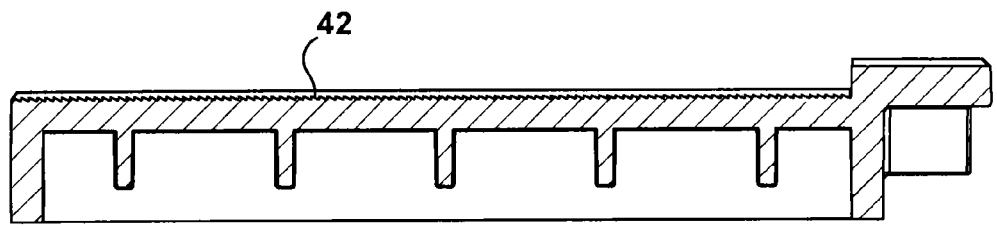
FIG. 11 is a cross-sectional side view of the second portion of the ramp insert taken along line A-A of FIG. 9.
Figure 12:
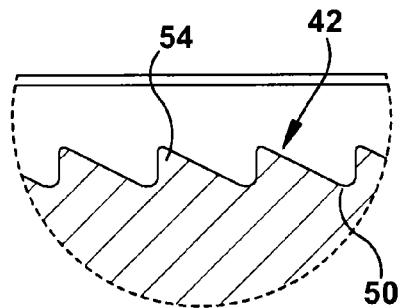
FIG. 12 is a close up view of detail B of FIG. 11.
Figure 13:
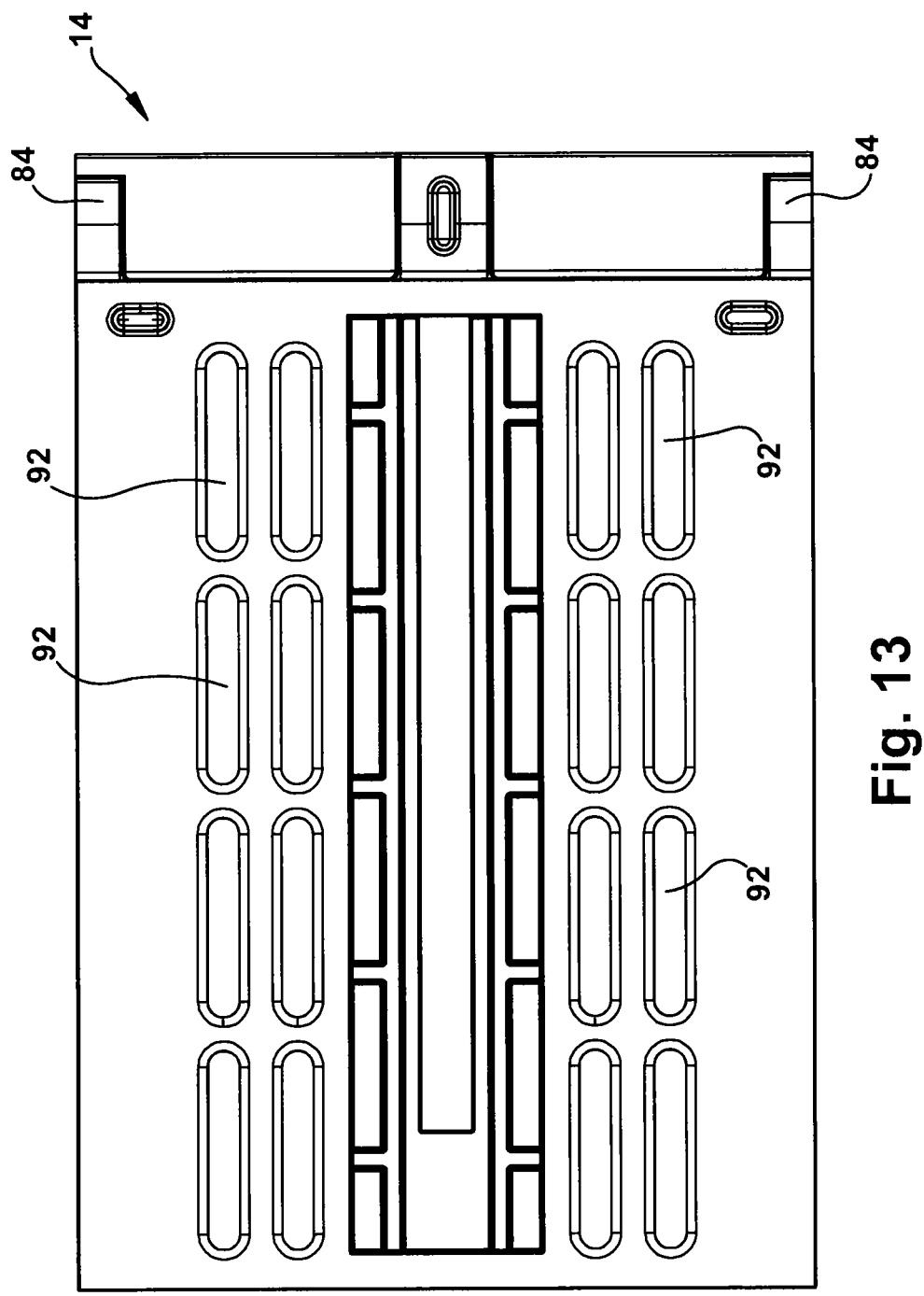
FIG. 13 is a bottom view of the second portion of the ramp insert of FIG. 9.

The first section 12 and the second section 14 may include cutout portions 70, 72, as shown in FIGS. 2B, 6 and 9. The ramp insert 10 may include a support member 22. The ramp insert 10 may include any appropriate number of support members 22. The support members 22 may be of any appropriate shape or size. The cutout portions 70, 72 may be of any appropriate shape or size, such as a recess aligned for insertion of the support member 22, as best shown in FIGS. 2B and 4, for example.

In an embodiment, each side of the ramp insert 10 may include the cutout portions 70, 72 such that there may be two support members 22 in the ramp insert 10. Due to movement of the first section 12 and the second section 14 to create different lengths of the ramp insert 10, support along the length of the ramp insert 10 and between the first section 12 and the second section 14 may improve the strength of the ramp insert 10. The support member 22 may be a tubular member, a solid-bodied member, an I-Beam member, or any other appropriate type of member capable of providing support for the first section 12 and the second section 14.

The support member 22 may be attached to the first section 12 or the second section 14 by any appropriate means, such as being fastened via fasteners, such as screws, rivets, adhesives or the like, fore example. In a preferred embodiment, the support member 22 may be attached to the first section 12 via fasteners 76 through the fastener holes 74, as best shown in FIG. 4. The support member 22 may also engage frictionally on the surfaces of the cutout 72 of the second section 14.

In an embodiment, the support member 22 may be positioned on a distal end 16 and a proximate end 18 of the ramp insert 10. One of ordinary skill in the art will appreciate that the support member 22 may be positioned at any appropriate location on the ramp insert 10 as well as be constructed in numerous other appropriate manners. The present invention should not be deemed as limited to any specific type of support member 22, any number of support members 22, or any location of the support member 22.

Figure 14:
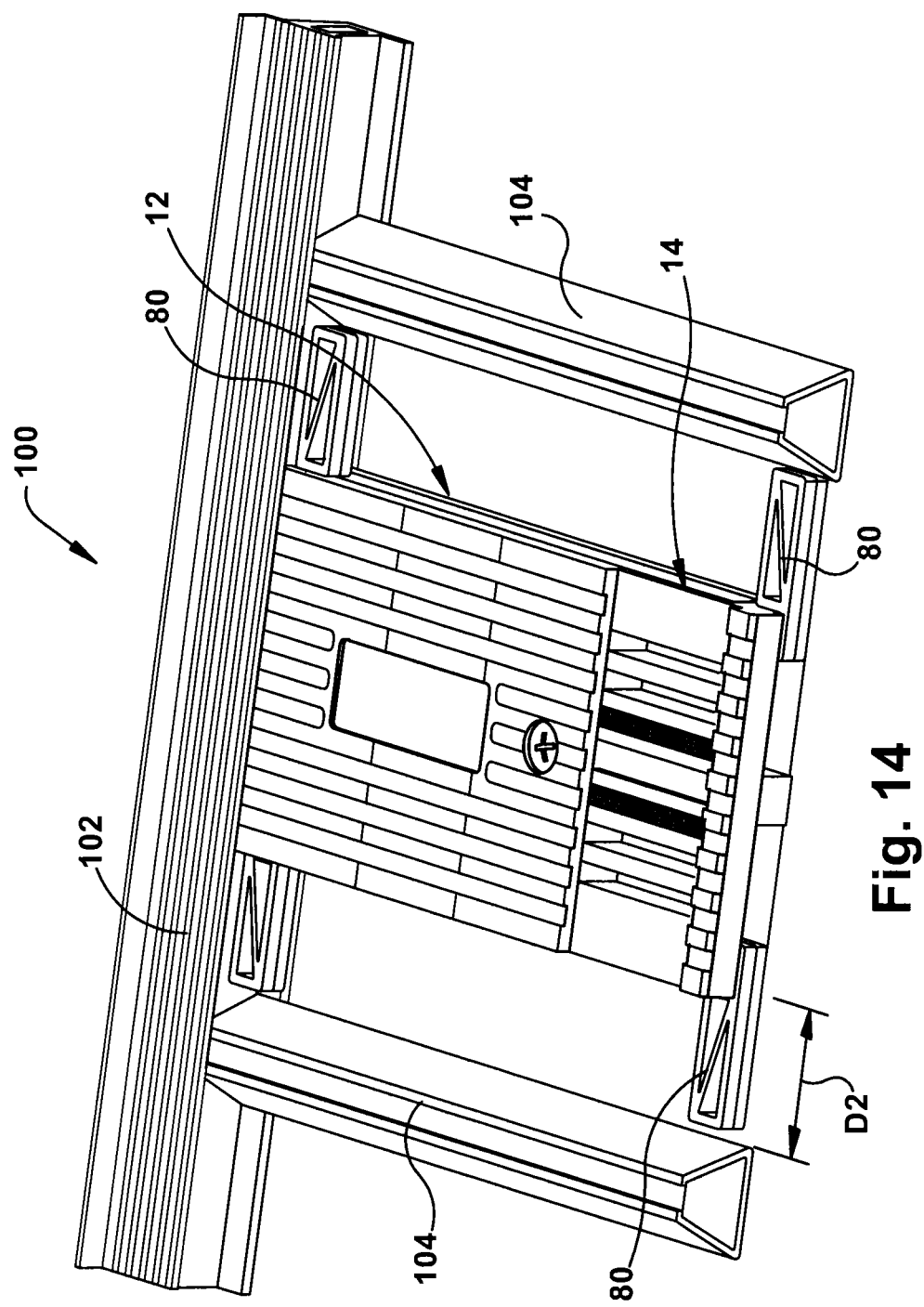
FIG. 14 is the ramp insert of FIG. 2B connected to a portion of a ramp in an embodiment of the present invention.

As shown in FIGS. 2A, 2B, 3, 5, 14, 18 and 19, the ramp insert 10 may include blocks 80. The blocks 80 may be of any appropriate shape or size. In a preferred embodiment, one of the blocks 80 may be attached at each of the four corners of the ramp insert 10. The blocks 80 may frictionally engage or otherwise connect to protrusions 84 of the ramp insert 10, as shown in FIG. 2A. The blocks 80 may be positioned at a first position as shown in FIG. 2A. At the first position, the blocks 80 may protrude or extend a distance D1 from the distal end 16 and the proximate end 18 of the ramp insert 10, as shown in FIG. 2A. The blocks 80 may be positioned at a second position, as shown in FIG. 14. At the second position, the blocks 80 extend or protrude a distance D2 from the proximate end 18 and the distal end 16 of the ramp insert 10. The distance D2 may be greater than the distance D1.

The blocks 80 at the first position or at the second position may be secured to the rails 102 and/or the rungs 104 of the ramp 100, as shown in FIGS. 1 and 14. In an embodiment, the blocks 80 may frictionally engage or otherwise be secured to the rails 102 and/or the rungs 104. To this end, the ramp insert 10 may have a first width (or length) at the first position of the blocks 80 and a second width (at length) at the second position of the blocks 80. The second width may be greater than the first width. In addition, the ramp insert 10 may have a third width where the blocks 80 may be removed from the ramp insert 10. The third width may be less than the first width and the second width. The blocks 80 may be interchangeable with other blocks 80 having different lengths so that the width of the ramp insert 10 can correspond to the open space between the rungs 104 of any type of ramp 100.

To ensure proper installation of the ramp insert 10 on the ramp 100, the ramp insert 10 may include an indicator 90. The ramp insert 10 may include an indicator 90 on the first section 12 and/or the second section 14, as shown in FIGS. 2A-3. The indicator 90 may be a line, marking, a groove, an indentation or any other appropriate type of distinguishing feature located at a predetermined distance from an end of the first section 12 and/or the second section 14. The predetermined distance may be substantially similar to the distance of a recess in the rungs 104 in which the ramp insert 10 may be used. Accordingly, the indicator 90 may be aligned with an edge of the rung 104 when the first section 12 and/or the second section 14 may be sufficiently within the rung 104. Therefore, the indicator 90 may provide the user with confidence that the ramp insert 10 is properly installed.

Figure 18:
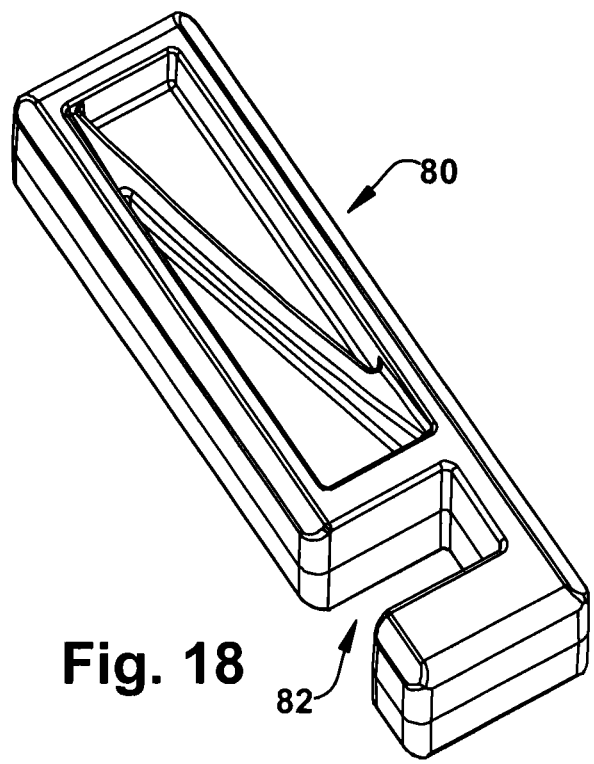
FIG. 18 is an isometric view of a block member that may be used to connect a ramp insert to a rail of a ramp in an embodiment of the present invention.
Figure 19:
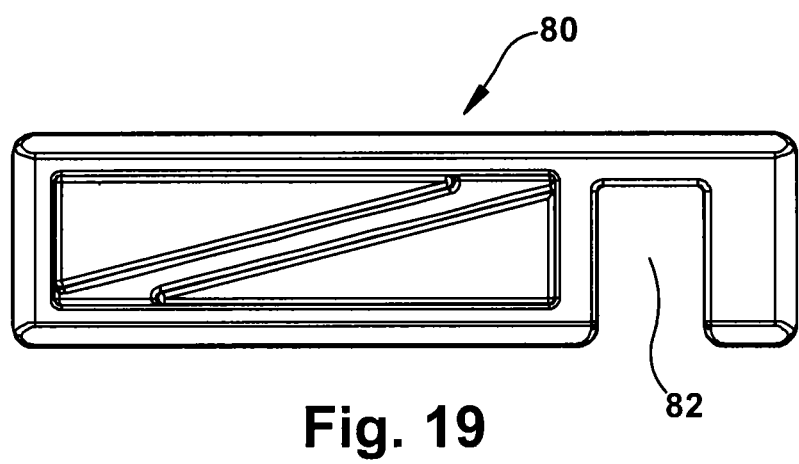
FIG. 19 is a top view of the block member of FIG. 18.

FIGS. 18 and 19 illustrate perspective view of the blocks 80 in an embodiment of the invention. The blocks 80 may include apertures 82. The apertures 82 may be of any appropriate shape or size. The ramp insert 10 may include protrusions 84. The protrusions 84 may be of any appropriate shape or size. The apertures 82 may engage the protrusions 84 of the ramp insert 10, as best shown in FIGS. 2B and 5.

Figure 15:
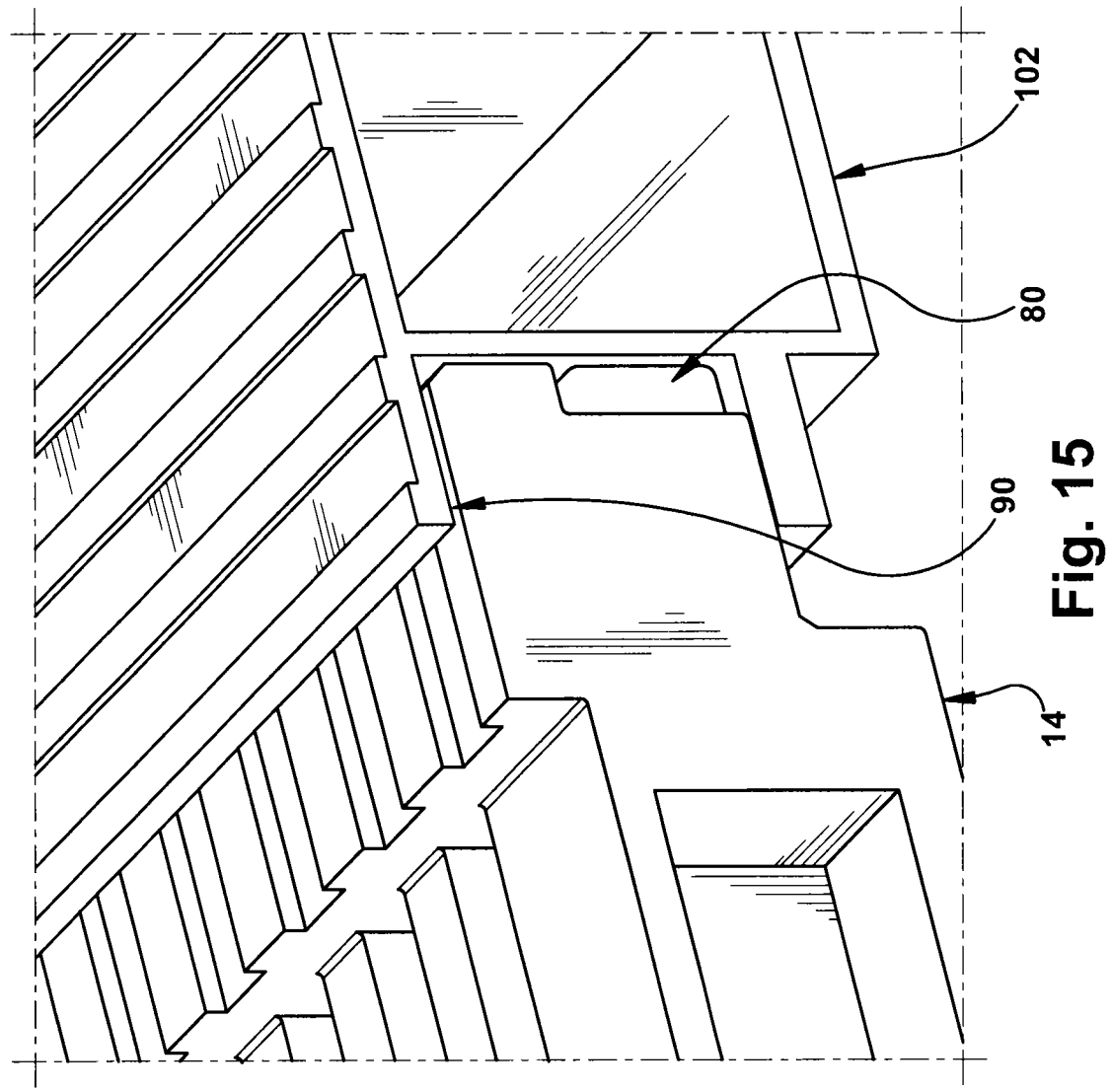
FIG. 15 is close up perspective view of the ramp insert secured to a rail of a ramp in an embodiment of the present invention.
Figure 16:
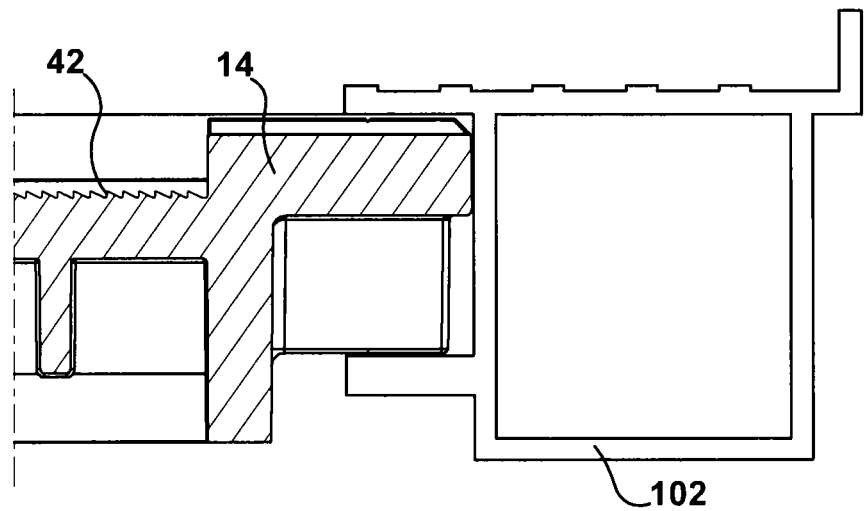
FIG. 16 is a close up side view of the ramp insert secured to a rail of a ramp in an embodiment of the present invention.

In a preferred embodiment, the shape and size of the apertures 82 may be capable of frictionally engaging the protrusions 84 of the ramp insert 10. In a preferred embodiment, the blocks 80 may be separable from the ramp insert 10. In use, the blocks 80 may be engaged on opposing sides by the rails 102, the ramp insert 10 and/or the rungs 104. For example, FIG. 15 illustrates the blocks 80 at the first position and maintained between the rails 102 and the second section 14 of the ramp insert 10. Although the blocks 80 may be shown as being separable from the ramp insert 10, one of ordinary skill in the art will appreciate that the blocks 80 may be temporarily or permanently affixed to the ramp insert 10, such as by connection to the protrusions 84.

The ramp insert 10 may be made of any appropriate type of material as will be appreciated by one of ordinary skill in the art. In an embodiment, the ramp insert 10 may be manufactured from polypropylene plastic, or other suitable thermoplastic material such as by injection molding, for example. In such an embodiment, the ramp insert 10 may include impressions 92, as best shown in FIGS. 5, 8, 10 and 13. The impressions 92 may reduce the amount of material needed to manufacture the ramp insert 10 and to assist in removing the ramp insert 10 from a mold. The impressions 92 may be of any appropriate shape, size or type, such as, grooves, indentations, openings and/or apertures, for example. The impressions 92 may also aid in dispersing the load on the ramp insert 10 and provide structural support.

In use, the ramp insert 10 may provide a structurally supportive surface at least partially filling an opening between successive rungs 104 of a ramp 100. As shown in FIGS. 1 and 14, the ramp insert 10 may be positioned between the rungs 104 of the ramp 100. The blocks 80 may be removed, moved to the first position or moved to the second position so that the ramp insert 10 has a width corresponding to the width of the ramp 100. In FIGS. 1 and 14, for example, the blocks 80 may be pivoted or otherwise moved to the second position. The ramp insert 10 may be inserted into one of the rails 102. The locking mechanism 24 may be unlocked, loosened, or otherwise disengaged from securement with the first section 12 and the second section 14.

The width of the ramp insert 10 may be adjusted by moving the first section 12 and/or the second section 14. When the width of the ramp insert 10 is extended to the distance between the rails 102 and positioned on or in the rails 102 and/or the rungs 104, the locking mechanism 24 may lock the first section 12 and the second section 14 and secure the ramp insert 10 to the ramp 100. Before locking the first section 12 to the second section 14, the user may ensure that the first section 12 and the second section 14 are sufficiently within the rails 102 (or the rungs 104) by ensuring that the indicator 90 is adjacent to, aligned with, or within the edges of the rails 102.

As a result, the ramp insert 10 may fill the gap between the successive rungs 104 of the ramp 100 for walking, standing and moving a vehicle or other object along the ramp 100. The description in this and the preceding paragraphs should not be deemed as limited to a required order for securing the ramp insert 10 to the ramp 100. The preceding steps to securing the ramp insert 10 may be accomplished in various orders within the spirit of the present invention.

Some additional embodiments of a ramp insert according the present teachings are described below. In the descriptions, all of the details and components may not be fully described or shown. Rather, the main features or components are described and, in some instances, differences with the above-described embodiment may be pointed out. Moreover, it should be appreciated that these additional embodiments may include elements or components utilized in the above-described embodiment although not shown or described. Thus, the descriptions of these additional embodiments are merely exemplary and not all-inclusive nor exclusive. Moreover, it should be appreciated that the features, components, elements and functionalities of the various embodiments may be combined or altered to achieve a ramp insert without departing from the spirit and scope of the present invention.

Figure 20:
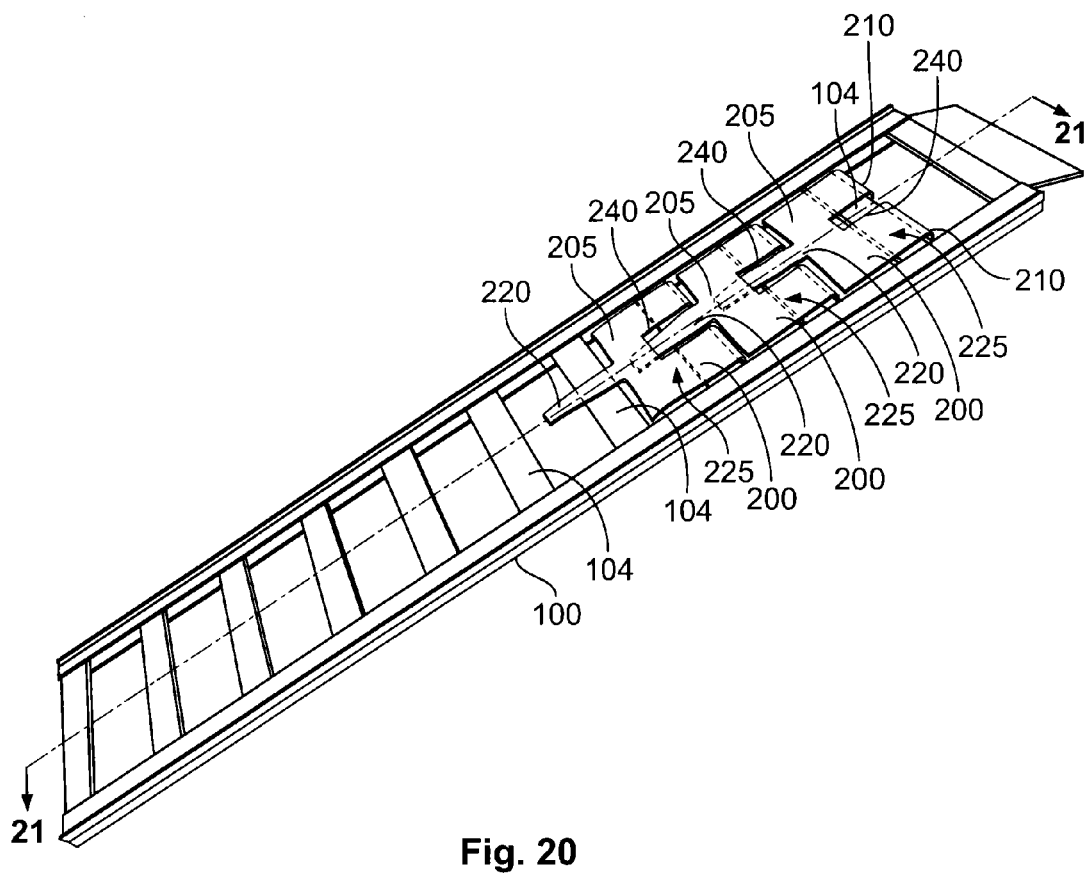
FIG. 20 is a perspective view of an alternative embodiment of a ramp insert installed in a ramp.
Figure 21:
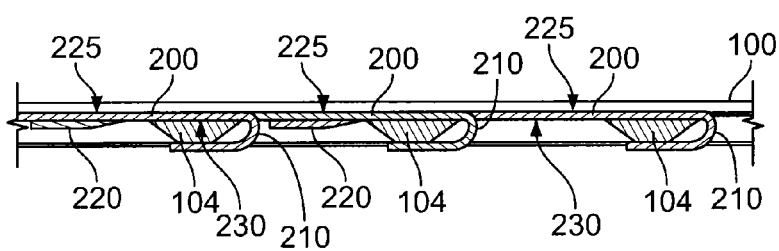
FIG. 21 is a fragmented cross-sectional view along line 21-21 of FIG. 20.

With reference to FIGS. 20-21, alternative embodiments of a ramp insert 200 are shown. The ramp insert 200 may be capable of being connected to the rungs 104 of the ramp 100 by any appropriate means, such as being connected between successive rungs 104 of the ramp 100, for example. The ramp insert 200 may provide a surface between adjacent rungs 104 of the ramp 100 where, for example, an item may be pushed up ramp 100 onto a vehicle. The surface of the ramp insert 200 may ease in the loading and unloading of items, such as, motorcycles, dirt bikes, bicycles, mopeds, ATVs, and the like. The ramp insert 200 may be removably attached to the ramp 100 such that it may be easily removed and attached to the ramp 100 at the discretion of the user.

In the embodiment shown in FIGS. 20-21, the ramp insert 200 may include a body 205, a hook portion 210, and a tail portion 220. The ramp insert 200 may be integrally formed as a one-piece component such that the body portion 205, hook portion 210 and tail portion 220 are formed from a single integral piece. Alternatively, the hook portion 210 and the tail portion 220 may be attached to the body portion 205 such as by welding, using a fastener or the like.

The body 205 may have a substantially flat top surface 225 and bottom surface 230. The substantially flat top surface 225 assists in the loading and unloading of items, such as, motorcycles, dirt bikes, bicycles, mopeds, ATVs, and the like as it may provide a substantially flat surface for which the item can ride. The substantially flat bottom surface 230 may permit the body 205 to sit substantially flat on the rungs 104 of the ramp 100.

In this embodiment, the hook portion 210 is sized to fit over the rung 104 of the ramp 100. In the embodiment shown, the ramp insert 200 may include two hook portions 210 that fit over the rung 104 of the ramp 100. The hook portions 210 may fit over the top of the rung 104 and extend or hook around the underside of the rung 104 that is immediately above the portion of the ramp 100 that the body 205 covers. While two hook portions 210 are shown, any number of such hook portions may be used with the ramp insert 200. The ramp insert 200 may be dimensioned to have the tail portion 220 extend over the next adjacent rung 104 of the ramp 100 when hooked thereto with hook portions 210. In this manner, ramp insert 200 may extend between a pair of adjacent rungs 104 and may fill a portion of the gap therebetween.

The body 205 may further include a cutout portion 240. The cutout portion 240 may be sized and shaped to allow the tail portion 220 to substantially fit within such cutout portion 240 so that a plurality of ramp inserts 200 may be positioned along ramp 100 in a continuous manner. As a result, a substantially continuous surface may be created using multiple ramp inserts 200 to facilitate loading and unloading of an item.

When attaching the ramp insert 200 to the rung 104, the tail portion 220 fits within the cut out 240 and may extend below the body 205 of the adjacent ramp insert 200 attached to the ramp 100, such as shown in FIG. 21. The tail portion 220 may provide additional support for the body 205 of the adjacent ramp insert 200 so that it may support items that may need to move up and down the ramp 100.

The ramp insert 200 may be made of any appropriate type of material as will be appreciated by one of ordinary skill in the art. In an embodiment, the ramp insert 200 may be manufactured from metal, polypropylene, or other suitable thermoplastic or polymer material such as by injection molding, by way of non-limiting example.

In the embodiment shown in FIGS. 20-21, the ramp insert 200 may be attached to the ramp 100 by placing the hook portion 210 or hook portions 210 around one of the rungs 104 of the ramp 100. The body 205 will have the bottom surface 230 thereof sitting on the rung 104 to which the hook portion 210 or hook portions 210 engage. The body 205 may then extend between the rungs 104 and the tail portion 220 may extend above (on top of) the next adjacent rung 104. If another ramp insert 200 is to be attached to the ramp 100, the steps above may be repeated except that a portion of the body 205 of the other ramp insert 200 may fit above the tail portion 220 of the ramp insert 200 attached to the ramp 100 immediately above. The steps above to attach the ramp insert(s) 200 to the ramp 100 may be done in any order, and is not limited to that described above.

Figure 22:
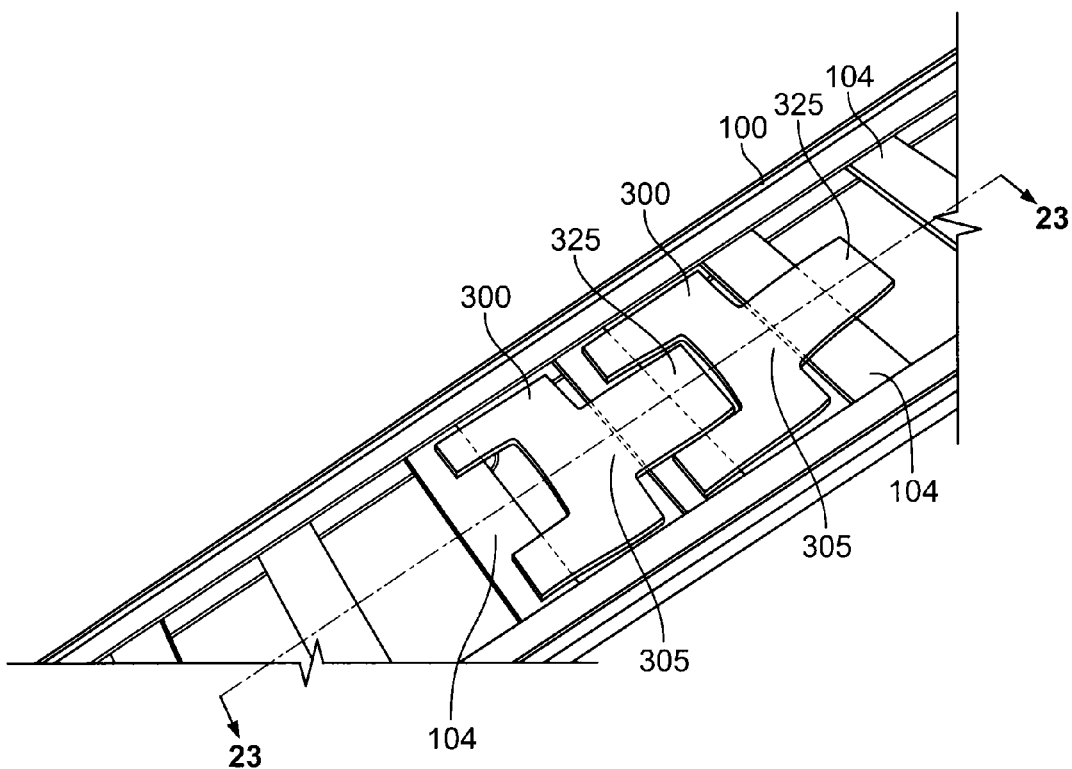
FIG. 22 is a fragmented perspective view of another alternative embodiment of ramp insert installed in a ramp.
Figure 23:
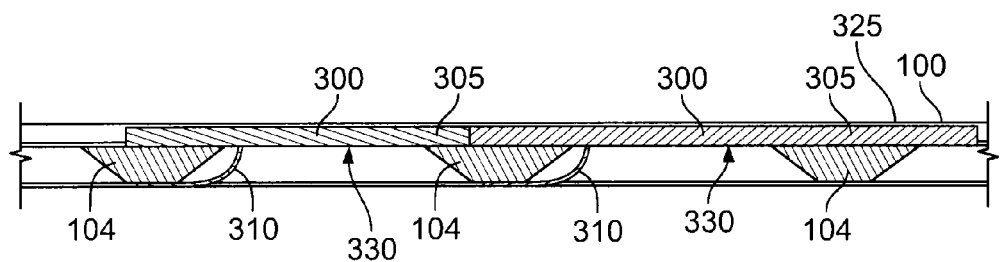
FIG. 23 is a fragmented cross-sectional view along line 23-23 of FIG. 22.

In another alternative embodiment, such as that shown in FIGS. 22-23, the ramp insert 300 is capable of being removably attached to the rungs 104 of the ramp 100. The ramp insert 300 may include a body 305, a hook portion 310, and a top portion 325. The body 305, hook portion 310 and top portion 325 may be integrally formed from a single piece. Alternatively, the hook portion 310 and top portion 325 may be attached to the body 305 such as by welding, using fasteners and the like.

The ramp insert 300 may include two hook portions 310; although any number of hooks may be used without departing from this embodiment. The hook portions 310 are capable of removably attaching to a rung 104 of the ramp 100. The hook portions 310 may be attached to or extend from a bottom surface 330 of the body portion 305 such that the hook portions 310 extend below the bottom surface 330 of the body portion 305. In this embodiment, the hook portions 310 may engage the rung 104; specifically, the hook portions 310 may engage a bottom surface of the rung 104 while body portion 305 engages the top surfaces of the rung 104 engaged with hook portion 310 and the next adjacent rung 104 with body portion 305 resting on top of the adjacent rungs 104, as shown in FIGS. 22 and 23. The hook portions 310 may hold the ramp insert 300 on the ramp 100.

The top portion 325 of the ramp insert 300 may be shaped and sized to fit between two hook portions 310 of an adjacent ramp insert 300 being attached to the ramp 100 shown in FIG. 22. This may create a substantially continuous surface that may allow an item to move up the ramp 100.

The ramp insert 300 may be made of any appropriate type of material as will be appreciated by one of ordinary skill in the art. In an embodiment, the ramp insert 300 may be manufactured from metal, polypropylene, or other suitable thermoplastic or polymer material such as by injection molding, by way of non-limiting example.

In the embodiment shown in FIGS. 22-23, the ramp insert 300 may be attached to the ramp 100 by placing the hook portion 310 or hook portions 310 around the rung 104 of the ramp 100. The body 305 may have the bottom surface 330 thereof sitting on the rung 104 to which the hook portion 310 or hook portions 310 engages. The body 305 may then extend between adjacent rungs 104 and the top portion 325 may extend above (on top of) the next rung 104. If another ramp insert 300 is to be attached to the ramp 100, the steps above may be repeated and the other ramp insert 300 may fit between the top portion 325 of the ramp insert 300 immediately below. The steps above to attach the ramp insert 300 to the ramp 100 may be done in any order, and is not limited to that described above.

The invention has been described with reference to the preferred embodiment. Obviously, modifications and alternations will occur to others upon a reading and understanding of this specification. The claim as follows is intended to include all modifications and alterations insofar as they come within the scope of the claim or an equivalent thereof.

Having thus described the invention, the following is claimed:

1. A ramp insert for insertion between a pair of rails of a ramp, wherein the rails are a width apart, the ramp insert comprising:
a first body capable of engaging at least one of the rails;
a second body capable of engaging with the first body; and
wherein engagement of the first body with the second body engages the second body with the other one of the pair of rails.

2. The ramp insert of claim 1, further including a first block attached to the first body wherein the first block is capable of frictionally engaging at least one the rails.

3. The ramp insert of claim 2, further including a second block attached to the second body wherein the second block is capable of frictionally engaging the other of the pair of rails.

4. The ramp insert of claim 3, wherein location of the first and second blocks may be adjusted whereby the first and second bodies being engaged have a length corresponding to the width of the rails.

5. The ramp insert of claim 1, further comprising a locking mechanism capable of securing the engagement of the first body to the second body.

6. The ramp insert of claim 1, further comprising an indicator located on either of the first and second bodies, wherein the indicator is capable of aligning with a rung of the ramp when the first or second body is wedgingly engaged within the ramp.

7. The ramp insert of claim 1, wherein the first body is slidably engaged with the second body and the first and second bodies may be adjusted relative to one another through the slidable engagement.

8. A ramp insert for engagement with a ramp having first and second rails and a plurality of rungs, the ramp insert comprising:
a first body capable of engaging at least one of the first rail and one of the plurality of rungs;
a second body capable of engaging at least one of the second rail and one of the plurality of rungs, the second body being at least partially overlapped with the first body; and
wherein the first and second bodies are moveable relative to one another so that the second body engages with the second rail when the first body engages the first rail and engages with another one of the plurality of rungs when the first body engages the one of the plurality of rungs.

9. The ramp insert of claim 8 wherein the first body is capable of engaging both of the first rail and the one of the plurality of rungs and wherein the second body is capable of engaging both of the second rail and the another one of the plurality of rungs.

10. The ramp insert of claim 8 wherein the first body is slidably engaged with the second body.

11. The ramp insert of claim 10 further comprising a first stop located on the first body, wherein the first stop prevents further movement of the first body away from the second body to a position in which the first body and the second body may become disengaged.

12. The ramp insert of claim 11 further comprising a second stop located on the second body, wherein the first and second stops prevent further movement of the first and second bodies away from each other to a position in which the first body and the second body may become disengaged.

13. The ramp insert of claim 10, wherein the second body may retract into and extend from the first body.

14. A ramp insert for insertion between rails of a ramp, wherein said rails are a certain width apart, said ramp insert comprising:
   a body having an adjustable length, said body comprising:
      a first section including a first engaging portion;
      aid second section including a second engaging portion configured to operatively engage with said first engaging portion; and
      wherein one of said first or second sections is capable of slidably moving with respect to said other section via said first and second engaging portions;
   wherein said body is placed between the rails of the ramp; and
   wherein said length of said ramp insert is configured to be adjusted by moving said first section or said section to adjust to various widths of ramps.

15. The ramp insert of claim 14, further including a locking mechanism.

16. The ramp insert of claim 15, wherein said length of said body is extended to a distance between the rails and positioned on the rails, wherein said locking mechanism secures said first section and said second section together thereby securing said body to the ramp.

17. The ramp insert of claim 15, wherein said locking mechanism includes a screw and a nut, wherein rotation of said screw in a first direction permits movement of said first section or said second section to change the overall length of said body.

18. The ramp insert of claim 17, wherein rotation of said screw in a second direction opposite of said first direction, secures said first section and said second section thereby preventing relative movement of said first section and said second section.

19. The ramp insert of claim 14, wherein said first engaging portion includes a track portion having ribs.

20. The ramp insert of claim 19, wherein said ribs transmit a load from a center of said ramp insert to ends of the ramp and to the ground or vehicle in which the ramp is attached.

21. The ramp insert of claim 14, wherein said second engaging portion includes grooves.

22. The ramp insert of claim 14, further including at least one block, wherein said at least one block is capable of engagement on opposing sides by the rails, said body or the rungs.

23. The ramp insert of claim 22, wherein location of said blocks may be adjusted whereby said body has a length corresponding to the width of the ramp.

24. The ramp insert of claim 14, wherein said first section includes a serrated portion and said second section includes a serrated portion, wherein said serrated portion of said first section is configured to engage with said serrated portion of said second section.

* * * * *